United States Patent [19]

Wood

[11] Patent Number: 4,762,525
[45] Date of Patent: Aug. 9, 1988

[54] PREPACKAGED FIREBOX APPARATUS FOR OUTDOOR COOKING OR THE LIKE

[76] Inventor: William P. Wood, 2301 S. Placita Pitiquito, Tucson, Ariz. 85713

[21] Appl. No.: 62,142

[22] Filed: Jun. 15, 1987

[51] Int. Cl.⁴ ............................................. C10L 11/00
[52] U.S. Cl. ..................................... 44/534; 126/9 A
[58] Field of Search ............ 126/9 R, 9 A, 9 B, 25 R, 126/25 A, 283, 25 B; 44/38–40, 34, 41

[56] References Cited

U.S. PATENT DOCUMENTS

| | | | |
|---|---|---|---|
| 3,367,757 | 2/1968 | Church | 44/41 |
| 3,370,582 | 2/1966 | Rauh | 126/25 |
| 3,385,282 | 5/1967 | Lloyd | 126/25 |
| 3,491,743 | 11/1967 | Temp | 126/9 |
| 3,575,156 | 4/1971 | Hosford | 126/25 |
| 3,682,154 | 8/1972 | Mollere | 126/9 A |
| 3,841,298 | 10/1974 | Sellors | 126/9 A |
| 4,063,904 | 12/1977 | Beeson | 44/38 |
| 4,254,863 | 3/1981 | Katcs et al. | 206/216 |
| 4,460,377 | 7/1984 | Kalil | 44/40 |
| 4,530,343 | 7/1985 | Beck . | |
| 4,627,854 | 12/1986 | Pratt | 44/38 |

FOREIGN PATENT DOCUMENTS

| | | | |
|---|---|---|---|
| 556791 | 5/1958 | Canada | 44/40 |
| 604511 | 9/1960 | Canada . | |

Primary Examiner—James C. Yeung
Attorney, Agent, or Firm—Harry M. Weiss & Assoc.

[57] ABSTRACT

An improved prepackaged, inexpensive firebox for sale at retail stores for use in outdoor cooking on consumer supplied backyard grills or for use as a quick campsite campfire starter firebox or as a prepackaged firewood firebox for fireplaces or the like. The repackaged firebox is lightweight, portable, manageably sized for easy storage, semi-fire retardant, water repellant and completely fire consumable and can be used conveniently and safely by a novice consumer. The firebox is comprised of a specially designed cardboard container and a special arrangement of prepackaged layer combustible with kindling points varying sufficiently to ignite and maintain ignited a primary combustible layer such as hardwood mesquite logs found in the southwestern United States. The special arrangement of the layered combustibles produces a tieing effect within the cardboard container and further exert counter pressure against the top and bottom walls of the closed container in order to sustain rough treatment during shipment while maintaining the desired end use layered arrangement of the combustibles for starting a fire.

6 Claims, 2 Drawing Sheets

PREPACKAGED FIREBOX APPARATUS FOR OUTDOOR COOKING OR THE LIKE

FIELD OF THE INVENTION

The present invention relates to a new or improved prepackaged firebox for use in outdoor cooking in backyard or campsite grills or as a prepackaged firewood firebox for fireplaces or the like. More particularly, the invention relates to a prepackaged, lightweight, portable, semi-fire retardant, water repellant and fire consumable firebox which can be used conveniently and safely by a novice consumer for starting a fire at a backyard or campsite grill or in a fireplace grate.

DESCRIPTION OF THE PRIOR ART

Although the concept of a firebox for use in outdoor cooking is known in the art, the prior art teachings have combined the firebox element with other elements such as a grill, merchandising wrappers, stands, aluminum foil or other undesireable and ineffective elements such as the prepackaged combustibles which are provided. It is believed that the combination of the firebox with other elements has led to a costly situation which is not attractive to the average consumer. Typical of this observation are U.S. Pat. Nos. 4,530,343, 3,491,743 and 3,370,582 which teach a picnic grill kit having a grill and fire consumable box or the like. The prior art solutions have inadequately addressed the need to have a firebox which is truly a fire consumable firebox, which is safe, portable, water repellant and ready to be used by a novice consumer. Additionally, prior art firebox solutions are provided with combustibles which are difficult to ignite and are impregnated with starter fuel substances which are offensive to the smell senses of consumers.

Consequently, a need exists for a firebox which fulfills the need for an inexpensive firewood source which is truly fire consumable and is prepackaged for sale at retail stores and is not cluttered with elements that the average consumer would prefer to supply separately. A need further exists for a firebox which is packaged economically yet is manageably sized and lightweight for easy storage and handling and further contains combustibles which are naturally occuring such as hardwoods which emit a pleasant aroma as they are burning and impart an equivalent pleasing flavor onto the meat or the like being cooked.

SUMMARY OF THE INVENTION

The present invention provides an improved prepackaged firebox designed to satisfy the aforementioned needs. Therefore, a primary object of the invention is directed at providing an improved prepackaged, inexpensive firebox for sale at retail stores for use in outdoor cooking on consumer supplied backyard grills or for use as a quick campsite campfire starter firebox or as a prepackaged firewood firebox for fireplaces or the like. Another object is to provide a prepackaged, lightweight, portable, semi-fire retardant, water repellant and fire consumable firebox which can be used conveniently and safely by a novice consumer for starting a fire at a backyard or campsite grill or in a fireplace grate.

Yet another object is to provide a prepackaged firebox which is packaged economically yet is manageably sized and lightweight for easy storage and handling and is further comprised of layered combustibles which are naturally occuring such as the mesquite hardwood of the Southwestern United States which emits a pleasant aroma as they are burning and impart an equivalent pleasing flavor onto the meat or the like being cooked.

Still another object is to provide a prepackaged firebox sold in a fire consumable merchandising container with the layered combustibles arranged within so as to exert counter pressure against the top and bottom walls of the closed container in order to sustain rough treatment during shipment while maintaining the desired end use layered arrangement of the combustibles for starting a fire.

Accordingly, the present invention relates to an improved prepackaged, portable firewood firebox provided with a water repellant, fire retardant, yet fire consumable container having within it, specially arranged, naturally occuring, layered combustibles ready for use by even the most novice consumer. Therefore to the accomplishments of the foregoing objects, the invention consists of the features hereinafter fully described and particularly pointed out in the claims, the accompanying drawings and following disclosure describing in detail the invention, such drawings and disclosure illustrating, however, but one of the various ways in which the invention may be practiced.

DETAILED DESCRIPTION OF THE PREFERRED EMBODIMENT

Figure 1:
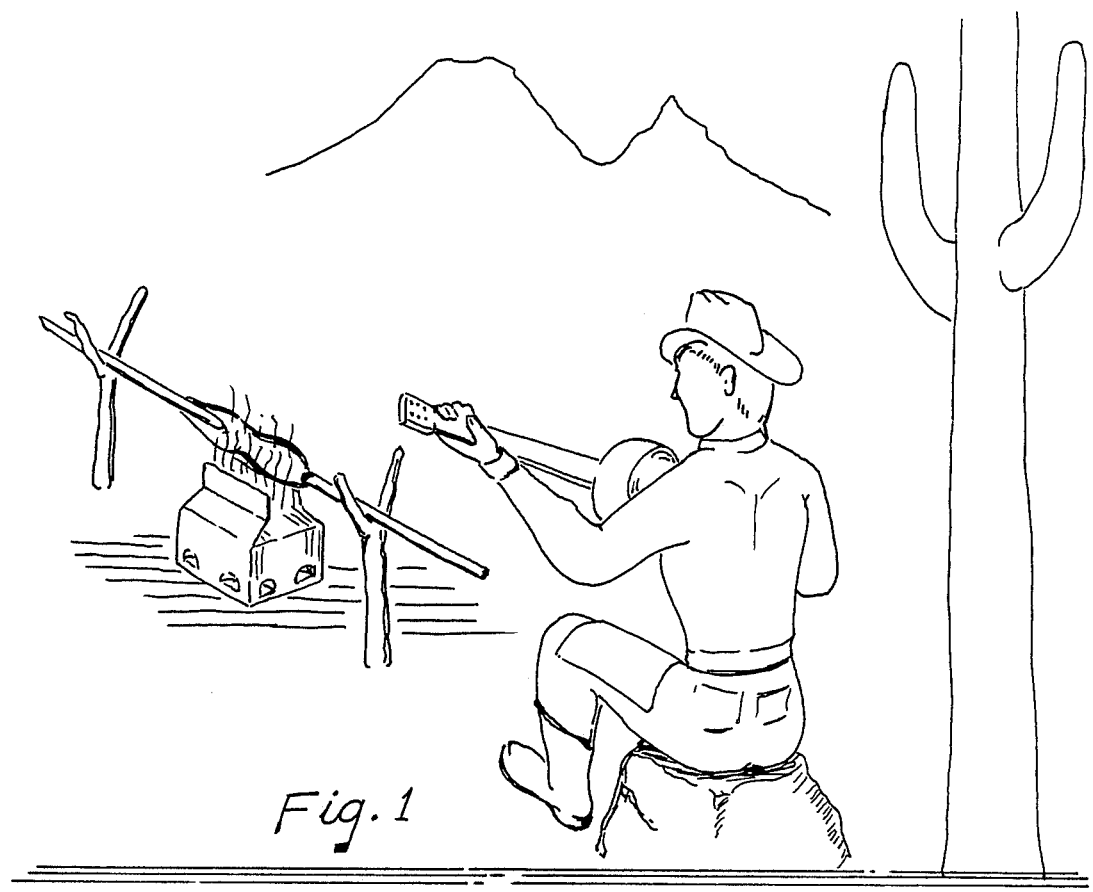
FIG. 1 is a perspective view of the preferred embodiment of the invention shown in an outdoor western campfire setting illustrating the convenience of a prepackaged firewood firebox in a firewood barren environment.
Figure 2:
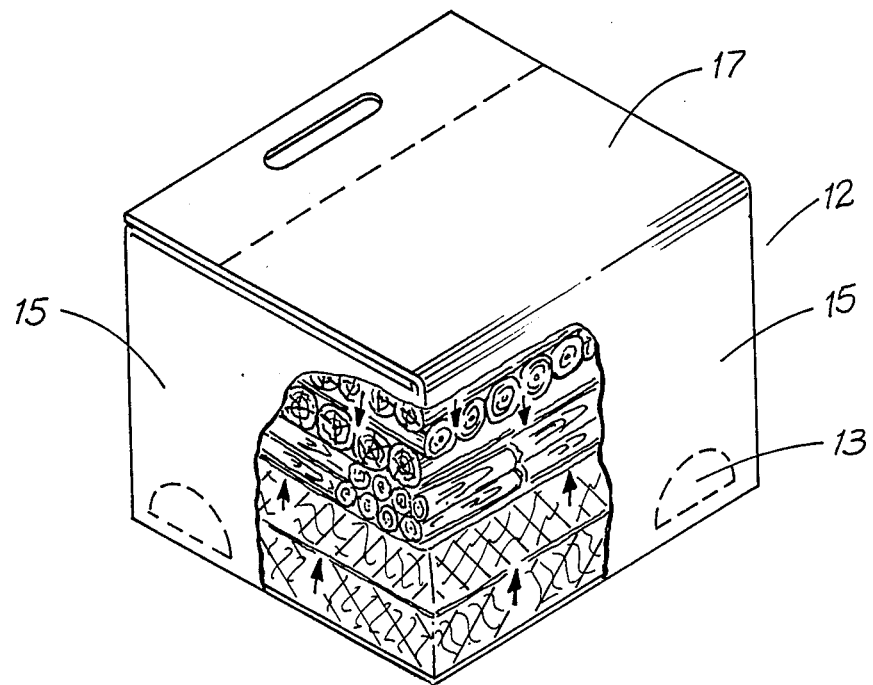
FIG. 2 is a perspective view of the preferred embodiment of the invention showing the closed merchandising container with a partial cut-away to show the specially arranged layered combustibles exerting opposed vertical force on the top and bottom of the fire consumable merchandising container.
Figure 4:
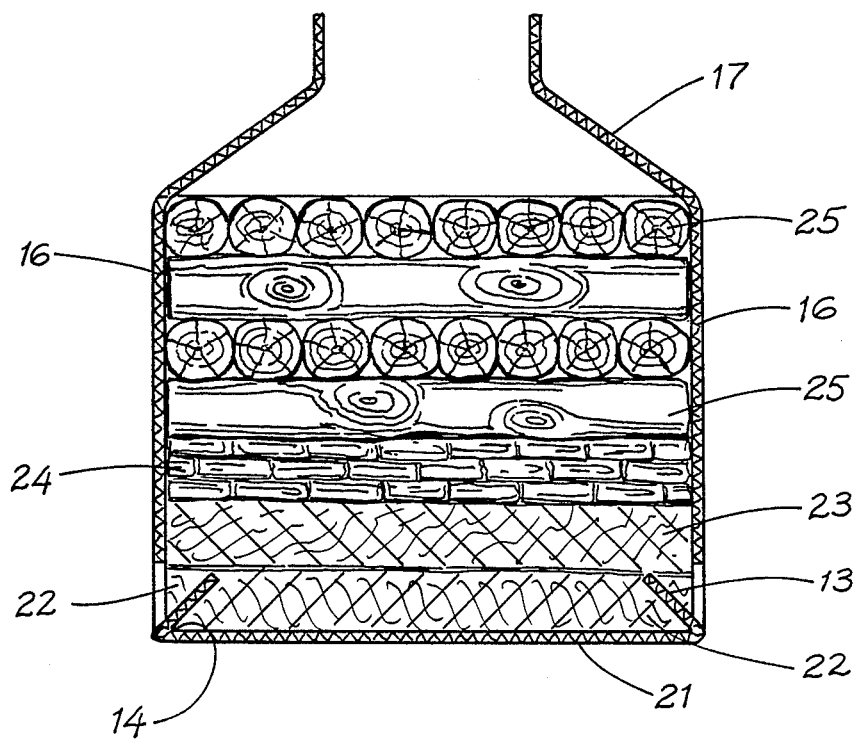
FIG. 4 is a schematic sectional elevation taken along the line 4—4 of FIG. 3 showing the specially arranged layered combustibles and fire consumable merchandising container.

Referring now to the drawings and more particularly to FIG. 1, there is shown in a western setting prepackaged firebox 11 illustrative of the convenience of having a prepackaged firewood firebox where typically there is no firewood to be gathered. FIG. 2 shows firebox 11 provided in a cardboard construction box 12, having generally but not limited to, a rectangular shape to accommodate the needs of the consumer. A cardboard construction is generaly preferred due to non-toxic materials and econonical methods used in fabrication, and to the wood fiber nature of the base material used in the construction which is entirely fire consumable leaving only a fine ash. FIG. 2 shows box 12 having a plurality of pre-scored, air inlet windows 13 located near bottom of sides 15 of box 12. As can best be seen in FIG. 4, box 12 contains a plurality of layered combustibles, arranged to have the lowest kindling point material at the bottom and the highest kindling point material, or primary combustible at the top. In particular, FIG. 4 shows a fire starter material, such as aspen fibers, 22, followed by next layer of higher kindling point such as an excelsior 23, which is followed by yet a higher kindling point material such as kindling 24 and concluding with the primary combustible having the highest kindling point such as hardwood logs 25, preferably seasoned, mesquite wood found in the southwestern United States which burns slow and clean and yields heat at approximately 2000 degrees farenheit. The layered arrangement shown in FIG. 4 also shows the primary combustible 25 arranged in alternating longitudinal and latitudinal layers. This arrangement is preferred because of the tieing effect produced by such arrangement to assure that the prepackaged combustible maintain the layered arrangement for end use. Also, a can best be seen in FIG. 2, the resiliency of the prepackaged layered combustibles, 22, 23, 24 and 25 complement each other by producing opposing vertical forces against top cover 17 and bottom 21. These opposing vertical foces produced when box 12 is in a closed state, further assure that the prepackaged combustibles maintain the intended layered arrangement for end use.

Figure 3:
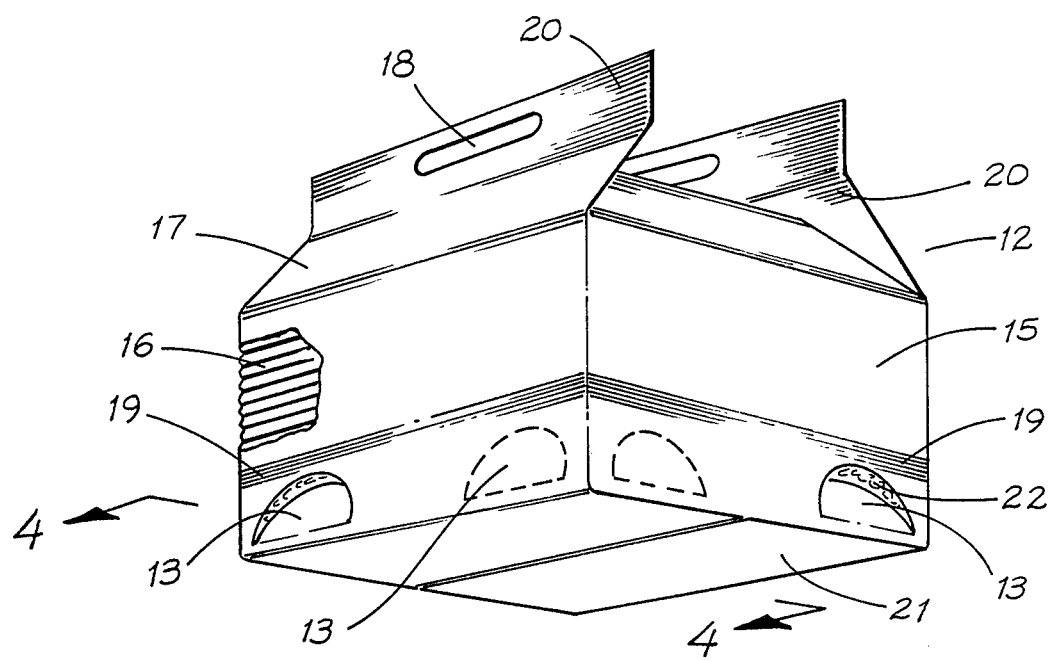
FIG. 3 is a perspective view of the fire consumable merchandising container showing the bottom, prescored air inlet ports, fire retardant, water repellant and portability features of the invention.

The improved features of firebox 11 are best seen by referring to FIG. 3 where cardboard box 12 is shown in an open state where prescored air inlet windows 13 have been pushed in to illustrate where a consumer may apply a match to ignite starter combustible layer 22 and also to facilitate a draft of air into box 12. As best seen in FIG. 4, each prescored air inlet window 13 is provided with a hingepoint 14 to allow the user to control the airflow into box 12 and thereby control how fast layered combustibles 22, 23, 24 and 25 will burn. To further retard the fire consumption of cardboard box 12, sides 15 have been constructed to have corrugated ribs 15 run horizontally and parallel with bottom 21. It should be appreciated that by having ribs 16 constructed to run horizontally, the airflow within sides 15 does not contribute to the upward air draft created by the burning layers of combustibles 22, 23, 24 and 25. To yet further retard the fire consumption of cardboard box 12, a fire retartant coating 19, such as paraffin, dried glue, or sodium silicate, is applied to a bottom portion of box 12 to allow the layerd combustibles, 22, 23, 24 and 25 sufficient time to begin burning and thus avoid early collapse of the contents. FIG. 3 also shows cardboard box 12 coated inside and outside with a water repellant coating 20, such as paraffin. It should be noted that a paraffin material will serve both purposes of a fire retardant and as a water repellant due to its inherent properties. Shown also in FIG. 3 is top cover 17 provided with hand hold slots 18 for easy carrying of firebox 11.

Once having determined where to use firebox 11, the consumer would provide an ignition source through window 13 to ignite bottommost layer 22, repeating as required at other window 13 to create a uniform fire and adjusting at each hinge 14 to control the air draft into box 12. The fire would spread upward igniting layers 23 and 24 until ultimately the primary combustible 25 would be burning in a continuous fashion for use by the consumer. Primary combustibles 25 is arranged in alternating longitudinal and latitudinal manner to create a flue effect which will help maintain the upward air draft for continuous combustion. The exact point in time which the consumer utilizes the firebox after combustion is entirely optional and depends on the particular use. After a period of time, firebox 11 is completely consumed by the fire leaving only a fine ash which may be readily disposed or covered with earth.

Therefore, while the present invention has been shown and described herein in what is conceived to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. An improved, inexpensive and prepackaged firewood firebox designed for sale at retail stores for use by novice and other consumers in outdoor cooking on consumer supplied backyard grills or for use as a quick campsite campfire starter firebox or as a prepackaged firewood firebox for fireplaces or the like, comprising:
    (a) a lightweight, manageably sized, portable, semi-fire retardant, water repellant and fire consumable merchandising container,
    said merchandising container being shaped in the form of a rectangular box having a top which may be opened and closed, four side walls and a bottom defining a base for said container,
    said merchandising container is constructed from cardboard, wood fiber material,
    said top of said merchandising container is provided with hand holds for ease of carrying,
    said side walls of said merchandising container are provided with a plurality of pre-scored air inlet window located near said bottom of said container to help create an airflow within said container, said pre-scored air inlet windows further being provided with a hinge point to allow adjustment of inward and outward movement of said pre-scored air inlet windows to control said created airflow and a convenient place to insert a flame,
    said side walls of said merchandising container are constructed to have corrugated ribs run horizontally with said bottom to thus impede airflow upwardly in said side walls of said container so as to retard the fire consumption of said container; and
    (b) a plurality of layered combustibles prepackaged within said merchandising container, said plurality of layered combustibles within said container defining an arrangement such that the lowest kindling point layer members are located at said bottom of said container, the highest kindling point layer members are located nearest said top of said container and intermediate kindling point layer members are located therebetween said lowest kindling point layer members and said highest kindling point layer members, said arrangement producing opposing vertical forces on said top and bottom of said merchandising container when said top is closed, said highest kindling point layer members being arranged in alternating longitudinal and latitudinal direction to produce a tieing effect on said prepackaged layered combustibles within said merchandising container, said lowest kindling point layer members are aspen fibers, said intermediate kindling point layer members are excelsior and assorted sizes of wood chips, and said highest kindling point layer members are hardwood logs.

2. An improved, inexpensive and prepackaged firewood firebox as recited in claim 1 wherein:

said top, bottom and side walls of said merchandising container are coated inside and outside with a water repellant material, such as paraffin.

3. An improved, inexpensive and prepackaged firewood firebox as recited in claim 1 wherein:
    said side walls of said merchandising container have a bottom portion provided with a fire retardant coating, such as paraffin.

4. An improved, inexpensive and prepackaged firewood firebox as recited in claim 1 wherein:
    said highest kindling point layer members are mesquite wood.

5. An improved, inexpensive and prepackaged firewood firebox designed for sale at retail stores for use by novice and other consumers in outdoor cooking on consumer supplied backyard grills or for use as a quick campsite campfire starter firebox or as a prepackaged firewood firebox for fireplaces or the like, comprising:
    (a) a lightweight, manageably sized, portable, semi-fire retardant, water repellant and fire consumable merchandising container,
    said merchandising container being shaped in the form of a rectangular box having a top which may be opened and closed, four side walls and a bottom defining a base for said container,
    said merchandising container is constructed from cardboard, wood fiber material,
    said top of said merchandising container is provided with hand holds for ease of carrying,
    said side walls of said merchandising container are provided with a plurality of pre-scored air inlet window located near said bottom of said container to help create an airflow within said container, said pre-scored air inlet windows further being provided with a hingepoint to allow adjustment of inward and outward movement of said pre-scored air inlet windows to control said created airflow and a convenient place to insert a flame,
    said side walls of said merchandising container are constructed to have corrugated ribs run horizontally with said bottom to thus impede airflow upwardly in said side walls of said container so as to regard the fire consumption of said container,
    said top, bottom and side walls of said merchandising container are coated inside and outside with a water repellant material, such as paraffin, and
    said side walls of said merchandising container have a bottom portion provided with a fire retardant coating, such as parafin; and
    (b) a plurality of layered combustibles prepackaged within said merchandising container, said plurality of layered combustibles within said container defining an arrangement such that the lowest kindling point layer members are located at said bottom of said container, the highest kindling point layer members are located nearest said top of said container and intermediate kindling point layer members are located therebetween said lowest kindling point layer members and said highest kindling point layer members, said arrangement producing opposing vertical forces on said top and bottom of said merchandising container when said top is closed, said highest kindling point layer members being arranged in alternating longitudinal and latitudinal direction to produce a tieing effect on said prepackaged layered combustibles within said merchandising container,
    said lowest kindling point layer members are aspen fibers,
    said intermediate kindling point layer members are excelsior and assorted sizes of wood chips, and
    said highest kindling point layer members are hardwood logs.

6. An improved, inexpensive and prepackaged firewood firebox designed for sale at retail stores for use by novice and other consumers in outdoor cooking on consumer supplied backyard grills or for use as a quick campsite campfire starter firebox or as a prepackaged firewood firebox for fireplaces or the like, comprising:
    (a) a lightweight, manageably sized, portable, semi-fire retardant, water repellant and fire consumable merchandising container,
    said merchandising container being shaped in the form of a rectangular box having a top which may be opened and closed, four side walls and a bottom defining a base for said container,
    said merchandising container is constructed from cardboard, wood fiber material,
    said top of said merchandising container is provided with hand holds for ease of carrying,
    said side walls of said merchandising container are provided with a plurality of pre-scored air inlet window located near said bottom of said container to help create an airflow within said container, said pre-scored air inlet windows further being provided with a hingepoint to allow adjustment of inward and outward movement of said pre-scored air inlet windows to control said created airflow and a convenient place to insert a flame,
    said side walls of said merchandising container are constructed to have corrugated ribs run horizontally with said bottom to thus impede airflow upwardly in said side walls of said container so as to retard the fire consumption of said container,
    said top, bottom and side walls of said merchandising container are coated inside and outside with a water repellant material, such as paraffin, and
    said side walls of said merchandising container have a bottom portion provided with a fire retardant coating, such as parafin; and
    (b) a plurality of layered combustibles prepackaged within said merchandising container, said plurality of layered combustibles within said container defining an arrangement such that the lowest kindling point layer members are located at said bottom of said container, the highest kindling point layer members are located nearest said top of said container and intermediate kindling point layer members are located therebetween said lowest kindling point layer members and said highest kindling point layer members, said arrangement producing opposing vertical forces on said top and bottom of said merchandising container when said top is closed, said highest kindling point layer members being arranged in alternating longitudinal and latitudinal direction to produce a tieing effect on said prepackaged layered combustibles within said merchandising container,
    said lowest kindling point layer members are aspen fibers,
    said intermediate kindling point layer members are excelsior and assorted sizes of wood chips, and
    said highest kindling point layer members are mesquite hardwood logs.

* * * * *